Jan. 19, 1965 C. F. MILLER ETAL 3,166,396

METHOD OF FORMING SEALED ARTICLE

Filed Sept. 15, 1960

WITNESSES

Edwin E. Baesler

Gordon H. Telfer

INVENTORS
Carl F. Miller &
Hilmar M. Heyn

BY Charles F. Renz
ATTORNEY

United States Patent Office 3,166,396
Patented Jan. 19, 1965

3,166,396

METHOD OF FORMING SEALED ARTICLE

Carl F. Miller, Bath, and Hilmar M. Heyn, Elmira, N.Y., assignors to Westinghouse Electric Corporation, East Pittsburgh, Pa., a corporation of Pennsylvania Filed Sept. 15, 1960, Ser. No. 56,303
5 Claims. (Cl. 65—32)

Figures 1, 2:
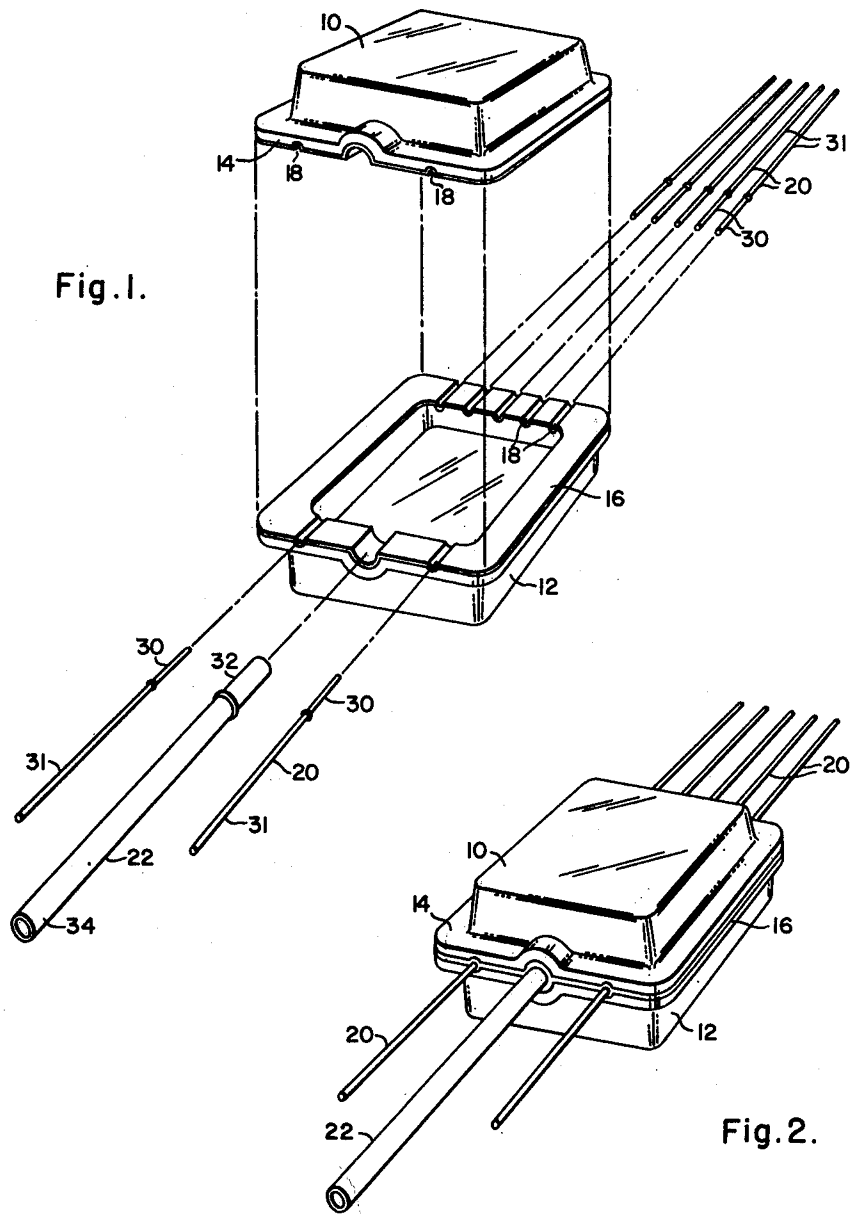

This invention relates to joining members in a manner to form tight seals between them such as the joining of glass or ceramic members for use as the envelopes of electronic tubes or the like. This invention also relates to the preparation of members prior to joining and, also, to the articles formed in accordance with the methods taught herein. The invention is particularly applicable to the formation of electronic tube envelopes having conductive lead members extending through the region in which the seal is formed.

Solder glass sealing materials, such as those disclosed in U.S. Patent 2,642,633, have become widely used for the formation of glass-to-glass, ceramic-to-ceramic, ceramic-to-glass, glass-to-metal or ceramic-to-metal seals because the solder glass flows at a temperature sufficiently low to avoid any problem of deformation of the parent members.

In the past, most sealing or joining operations in the electronic tube industry, particularly those employing a solder glass material, have been carried out in an air atmosphere. Heating is principally provided by gas flames or, where solder glass materials are used, in ovens also having an air atmosphere. The use of an air atmosphere, of course, permits the oxidation of any exposed metal parts that may be subjected to the heat applied to make the seal. Naturally, the effect of this oxidation depends on the time and temperature at which it is heated since relatively small amounts of oxide may, in certain devices, be tolerated. However, where it is necessary to perform a sealing operation at a relatively high temperature, of about 700 degrees centigrade or more for example, or for a relatively long time, such as about 1 hour, the effect of oxidation of the metallic components may be so detrimental as to make the sealed device inoperable.

Other atmospheres such as a vacuum, an inert atmosphere or a reducing atmosphere cannot be simply substituted for the air atmosphere for solder glass sealing because of the fact that the powered solder glass material is most readily deposited by first forming a suspension of it in a binder and a solvent or at least a mixture of the powdered solder glass and a binder. The binder material is usually of an organic material such as nitrocellulose or Lucite No. 44. The solvent which may be used is one such as butyl-Cellosolve or diethyl carbonate. When the suspension is applied to a member for joining, the volatile solvent evaporates rather quickly leaving the glass powder on the surface held by the organic binder. When a seal is formed in air this binder burns off. In other atmospheres, however, the binder is not sufficiently removed and a structurally weak seal results. Furthermore, use of a reducing atmosphere must be avoided because an oxide in the sealing glass, such as lead oxide, may be reduced with the result of a bad seal.

It is, therefore, an object of the present invention to form seals using a solder glass sealing material without producing harmful oxidation of metallic parts.

It is another object to provide seals which are uniformly strong and tight.

Another object is to provide an improved method of forming glass-to-glass, ceramic-to-ceramic, glass-to-metal seals particularly for use in sealing electron discharge devices.

According to the present invention, after the sealing material has been deposited on the surface of the member to be joined, a first heating operation is performed in an oxidizing atmosphere to remove the binder constituents from the sealing material. Then, after the members to be joined have been placed in sealing relationship, a second heating operation is performed in an inert atmosphere to a temperature sufficient to effect sealing. According to another feature of the invention, articles are provided having seals formed in the just mentioned manner.

The features of the present invention which are believed to be novel are set forth with particularity in the appended claims. The present invention, both as to its organization and manner of operation, together with the above-mentioned and further objects and advantages thereof, may best be understood by reference to the following description, taken in connection with the accompanying drawings, in which:

FIGURE 1 is an exploded view of the envelope and lead wires to be sealed therein for a type of electron discharge device with which the present invention may be used; and FIG. 2 is a perspective view of the components shown in FIG. 1 after sealing has been performed.

In the following discussion, the sealing of envelope members made of a devitrified glass material having certain ceramic-like properties, such as one of those disclosed in copending application, Serial No. 802,532, filed March 27, 1959, by F. C. M. Lin, now abandoned, and a continuation in part, filed May 3, 1961, application Serial No. 107,365, and assigned to the same assignee as the present invention, will be discussed. Materials of the same general type are also disclosed in U.S. Patent 2,920,971 and one such material is that sold under the trade name Pyroceram No. 9606. Such materials may be readily fabricated into various shapes by well known techniques and have excellent high temperature properties. It is a material which has been partially converted into a crystalline ceramic from its original glassy state by the use of heat treatment. This change of state is known as devitrification. As the term "devitrified" is used herein, it is meant that the change of state has occurred to a substantial extent but not necessarily completely. It is with such a material that the practice of the present invention is most advantageous because the problems encountered by prior art methods are more acute. A suitable solder glass sealing material for use with such envelope members is a thermosetting or devitrifying solder glass material which may be like those disclosed in the before mentioned application and Patent 2,920,971. Some commercially available materials which are suitable are those designated as Corning No. 7574 and Pyroceram Cement No. 45. Prior to the sealing operation, of course, the sealing material has not yet been devitrified. It will be obvious that members of other materials may also be sealed in accordance with the teachings of the present invention.

In FIG. 1 there is shown the components of the envelope and lead wires extending therethrough for an electron discharge device of the type which has been developed because of its advantages of compactness and ease of incorporating into a circuit which might be formed by printed circuit techniques. Such a device is more fully described in U.S. Patents 2,862,136, 2,907,911, 2,929,668 and 2,933,634. Of course, other devices may be sealed in accordance with the methods taught herein.

The device shown in FIG. 1 includes an upper envelope member 10 and a lower envelope member 12 having mating flange surfaces 14 and 16. The flange surfaces 14 and 16 have grooves 18 therein to accommodate lead wires 20 and an exhaust tubulation 22 which are to be sealed therein in a formation of the envelope.

Since good seals may be formed between devitrified glass members only at relatively high temperatures, it is necessary that the lead wires 20 be of a metal capable of withstanding high temperatures without deformation. The wires 20 are shown having a first part 30 to extend through the seal area which is of tungsten joined to a second part 31 of low carbon nickel on the outside. In this way, difficulties due to differences in thermal coefficients of expansion between the leads 20 and the envelope members 10 and 12 are minimized. Other materials may, of course, be used.

The exhaust tubulation 22 would be used to exhaust the device to the necessary vacuum before final sealing. The exhaust tubulation 22 comprises a short portion 32 in the seal area which may be of a similar material as that used for the envelope members 10 and 12 sealed to a longer portion 34 which may be of alumina-silicate glass tubing.

In FIG. 2, the same device is shown after having been assembled and sealed. The various components may of course be held in a suitable jig while the sealing operation is performed. It is apparent that the lead wires 20 must be sealed within the structure at the same time the envelope portions 10 and 12 are joined. It is also apparent that the internal components of the device, which are not shown but which would usually comprise at least a cathode, an anode and a grid, must also be within the envelope members 10 and 12 during the sealing operation. If these metallic elements are considerably oxidized during the sealing operation, it is difficult and expensive to subsequently deoxidize them and the electrical characteristics of the device are much impaired.

Therefore, in accordance with this invention, the flange surfaces 14 and 16 of one or both of the envelope portions 10 and 12 are first subjected to a presintering or preglazing operation consisting of the following operations. The suspension of the solder glass sealing material comprising the powdered solder glass in a suitable binder such as nitrocellulose or Lucite No. 44 and a solvent such as butyl-Cellosolve or diethyl carbonate is deposited on the flange surfaces 14 and 16 by any suitable method such as dipping, coating or spraying. It may also be desirable to apply a similar deposit of solder glass material to the surfaces of the lead wires 20 and the exhaust tubulation 22, but this has generally been found not essential to effect a good seal. Also, it is desirable that the metallic components not be subjected to this first operation which must be performed in an oxidizing atmosphere even though it may be performed at a relatively low temperature for a short time. The parts having the solder glass material deposited thereon are then heated in an oxidizing atmosphere to remove the binder constituents of the suspension and any solvent which may not have yet evaporated. The extent of heating need only be such to remove the binder and need not have any appreciable effect on the solder glass particles themselves. Typically, however, the powder solder glass material is fused together to some extent giving a sintered coating on the member. It may, if desired for any purpose, be heated to the extent that it flows and forms a fairly uniform layer on the surface. A limitation that must be imposed on this operation is that the heating time and temperature not be such as to cause the initiation of devitrification in the solder glass material. It is undesirable at this stage because the solder glass sets and will not flow readily to effect the final seal.

The presintered or preglazed members 10 and 12, the lead wires 20 and exhaust tubulation are then assembled in a suitable jig and the final seal effected by heating in an inert atmosphere at a temperature sufficient to melt the solder glass material and bond the parts together. Then, when a devitrifying solder glass material is used, it is heated further for at least partial devitrification forming a permanent seal which is not affected by baking out the tube or other processing which may involve high temperature. The heating may be performed in an oven, for example filled with nitrogen at atmospheric pressure or may be performed by flushing an inert gas such as argon through the tube during sealing. If desired, the sealing operation may be performed by providing one or more resistance heating wires around the flanges 14 and 16 to effect a relatively localized heating. A further heating operation may be performed if necessary, in a reducing atmosphere such as forming gas to reduce any oxide which may have formed on the metallic parts prior to sealing. After joining, the seal is annealed and then it may be cooled rapidly.

The following is an example of a specific method which has been carried out incorporating the teachings of this invention. The envelope portions are inspected to make sure that they contain no pin holes, hairline cracks or enclosed impurities and that the flange surfaces are sufficiently planar to align properly. The envelope members are then cleaned with amyl-acetate wiped on with cheese cloth and then dried. A solder glass suspension is formed of Corning No. 7574 in a binder of nitrocellulose and applied to the flange members in a coating of approximately 20 mils thick. The surfaces are then dried under an infra red lamp for about 30 minutes. A preglazing operation is then performed in an air atmosphere at about 610 to 620 degrees centigrade for about 5 minutes. This operation starts and ends at about room temperature at a heating and cooling rate of about 4 to 5 degrees centigrade per minute. The components are then assembled and sealed in an oven filled with nitrogen at about 720 degrees centigrade for about 60 minutes. This heating operation also begins and ends at about room temperature with a heating and cooling rate of about 3 degrees centigrade per minute.

Envelopes which have been sealed in accordance with the teachings of this invention have maintained a satisfactory vacuum after about 4,000 hours of continuous exposure at 400 degrees centigrade and after about 1500 hours to 3,000 hours at 500 degrees centigrade. It should also be noted that ceramic to metal seals may be formed in accordance with this invention without the necessity of metallizing the ceramic part first as in other methods.

While the present invention has been shown and described in certain forms only, it will be obvious to those skilled in the art that it is not so limited, but is susceptible of various changes and modifications without departing from the spirit and scope thereof.

We claim as our invention:

1. The method of joining a first member to a second member comprising the steps of depositing a quantity of a suspension of a sealing material having a flow point lower than that of either of said members on a surface of at least one of said members, heating said member having said sealing material thereon in an oxidizing atmosphere at a first temperature to remove the liquid constituents of said suspension, placing said second member in sealing relationship with said surface of said first member, and heating said first and second members in an inert atmosphere to a second temperature higher than the flow point of said sealing material but not as high as the flow point of either of said members.

2. The method of joining a first member of a material taken from the group consisting of glass, ceramic and metal to a second member of a material taken from the group consisting of glass and ceramic including the steps of depositing a quantity of a suspension of solder glass material having a flow point lower than that of either of said members on a surface of at least one of said members, heating said member having said solder glass material thereon in an oxidizing atmosphere at a first temperature to remove the liquid constituents of said suspension, placing said second member in sealing relationship with said surface of said first member and then heating said members in an inert atmosphere to a second temperature higher than the flow point of said solder glass material but lower than the flow point of either of said members.

3. The method of joining a first member to a second member comprising the steps of depositing on a surface of at least one of said members a quantity of a mixture of solder glass material in a binder, said solder glass material having a flow point lower than that of either of said members and having the property of devitrifying to an appreciable extent when subjected to certain heat treatment, heating said member having said solder glass material thereon to remove said binder in an oxidizing atmosphere at a first temperature not as high as the flow point of either of said members and not as high as the point at which appreciable devitrification of said solder glass material begins, placing said second member in sealing relationship with said surface of said first member and then heating said members in an inert atmosphere to a second temperature not as high as the flow point of either of said members, but higher than the point at which appreciable devitrification of said solder glass begins.

4. The method of forming a vacuum tight envelope for an electron discharge device or the like comprising the steps of depositing a mixture of powdered solder glass material and a binder on a first surface of a first envelope member, heating said first envelope member in an oxidizing atmosphere to remove said binder from said surface, placing said first surface of said first envelope member in sealing relationship with a second surface of a second envelope member and placing one or more metallic members to extend between said first and second surfaces, and then heating said first and second envelope members and said metallic members in an inert atmosphere to flow said solder glass material and to form vacuum tight seals between said first surface and said second surface and between said metallic members and each of said first and second surfaces.

5. The method of forming a vacuum tight envelope for an electron discharge device or the like comprising the steps of depositing a mixture of powdered devitrifying solder glass material and a binder on a first flange surface of a first envelope member comprised of a devitrified insulating material, said first flange surface having one or more grooves therein extending from the outer edge to the inner edge thereof, heating said first envelope member in an oxidizing atmosphere to remove said binder from said first flange surface, placing said first flange surface of said first envelope member in sealing relationship with a second flange surface of a second envelope member comprised of a devitrified insulating material, said second flange surface having grooves matching those in said first flange surface and placing one or more metallic and electrically conductive lead-in members to extend between said first and second flange surfaces in said grooves, heating said first and second envelope members and said lead-in members in an inert atmosphere to flow said powdered devitrifying solder glass material into a unitary mass and to form vacuum tight devitrified seals between said first flange surface and said second flange surface and between said metallic members and each of said first and second flange surfaces.

References Cited in the file of this patent

UNITED STATES PATENTS

| | | |
|---|---|---|
| 2,279,168 | Kalischer et al. | Apr. 7, 1942 |
| 2,889,952 | Claypoole | June 9, 1959 |
| 2,933,634 | Lederer | Apr. 19, 1960 |
| 2,959,493 | Vincent | Nov. 8, 1960 |
| 3,013,362 | Calkins et al. | Dec. 19, 1961 |
| 3,113,008 | Elmer | Dec. 3, 1963 |

OTHER REFERENCES

"Phase Diagrams for Ceramists," Levin; McMurdie & Hall, published by The American Ceramic Society, 1956, pages 14–25 and 206 cited.

"Handbook of Glass Manufacture," vol. II, Fay V. Tooley, 1960, pages 187 to 199 cited.